United States Patent
Pappas et al.

(10) Patent No.: US 11,697,728 B2
(45) Date of Patent: Jul. 11, 2023

(54) RUBBER COMPOSITIONS WITH DISSAGREGATED CARBON NANOTUBES

(71) Applicant: Compagnie Generale des Etablissements Michelin, Clermont-Ferrand (FR)

(72) Inventors: Christopher Pappas, Charlotte, NC (US); Christophe Chouvel, Chamalieres (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 329 days.

(21) Appl. No.: 16/961,596

(22) PCT Filed: Jan. 14, 2019

(86) PCT No.: PCT/US2019/013467
§ 371 (c)(1),
(2) Date: Jul. 10, 2020

(87) PCT Pub. No.: WO2019/140369
PCT Pub. Date: Jul. 18, 2019

(65) Prior Publication Data
US 2021/0061973 A1  Mar. 4, 2021

Related U.S. Application Data

(63) Continuation of application No. PCT/US2018/013609, filed on Jan. 12, 2018.

(51) Int. Cl.
| | |
|---|---|
| *C08L 9/06* | (2006.01) |
| *B60C 1/00* | (2006.01) |
| *B60C 11/00* | (2006.01) |
| *C08J 3/22* | (2006.01) |
| *C08K 3/04* | (2006.01) |
| *C08J 3/20* | (2006.01) |
| *C08F 236/06* | (2006.01) |
| *C08F 236/08* | (2006.01) |
| *C08L 7/00* | (2006.01) |
| *C08L 25/10* | (2006.01) |

(52) U.S. Cl.
CPC ............. *C08L 9/06* (2013.01); *B60C 1/0016* (2013.01); *B60C 11/0008* (2013.01); *C08F 236/06* (2013.01); *C08F 236/08* (2013.01); *C08J 3/203* (2013.01); *C08J 3/22* (2013.01); *C08J 3/226* (2013.01); *C08K 3/041* (2017.05); *C08L 7/00* (2013.01); *C08L 25/10* (2013.01); *B60C 2011/0025* (2013.01); *C08J 2309/06* (2013.01); *C08K 2201/003* (2013.01); *C08K 2201/005* (2013.01); *C08L 2205/02* (2013.01); *C08L 2205/03* (2013.01); *C08L 2310/00* (2013.01); *C08L 2312/00* (2013.01)

(58) Field of Classification Search
CPC ........... C08L 9/06; C08L 25/10; C08K 3/041; C08K 2201/005; B60C 1/0016; B60C 11/0008; C08F 236/06; C08F 236/08; C08J 2309/06
See application file for complete search history.

(56) References Cited

U.S. PATENT DOCUMENTS

| | | | |
|---|---|---|---|
| 2008/0207871 A1 | 8/2008 | Seiler et al. | |
| 2011/0146859 A1 | 6/2011 | Schmitz et al. | |
| 2017/0369660 A1 | 12/2017 | Seisuke | |
| 2020/0407537 A1* | 12/2020 | Pappas | ........................ C08L 9/06 |
| 2021/0079204 A1* | 3/2021 | Pappas | ................. B60C 11/0008 |

FOREIGN PATENT DOCUMENTS

| | | |
|---|---|---|
| CN | 104262698 A2 | 9/2014 |
| CN | 104130478 A | 11/2014 |
| CN | 105860133 A | 8/2016 |
| EP | 2607408 A1 | 3/2013 |
| EP | 2607407 A1 | 6/2013 |
| KR | 20120133258 A | 10/2012 |
| WO | WO2012080626 A2 | 6/2012 |

OTHER PUBLICATIONS

European Patent Office; International Search Report and Written Opinion for patent application PCT/US2018/013609; dated Oct. 1, 2018; Publisher: European Patent Office, Rijswijk, Netherlands, pp. 1-11, enclosed.

European Patent Office; International Search Report and Written Opinion for patent application PCT/US2019/013467; dated Feb. 27, 2019; Publisher: European Patent Office, Rijswijk, Netherlands, pp. 1-11, enclosed.

* cited by examiner

*Primary Examiner* — Edward J Cain
(74) *Attorney, Agent, or Firm* — John Steckler Schwab

(57) ABSTRACT

Described are articles including treads and/or other tire components that are formed at least in part by rubber compositions having solid agglomerated material comprising disaggregated carbon nanotubes. Such rubber compositions include a diene rubber component and a solid agglomerated material comprising disaggregated carbon nanotubes that consist of a continuous network of carbon nanotubes that contains 1) voids and 2) aggregates of carbon nanotubes having a mean size $d_{50}$ of less than 5 μm, the voids and the aggregates together in an amount that is less than 60% of a predetermined surface area, as determined by electron microscopy imagery analysis, the remainder being the disaggregated carbon nanotubes in the continuous network that do not comprise a clearly defined shape.

20 Claims, 1 Drawing Sheet

RUBBER COMPOSITIONS WITH DISSAGREGATED CARBON NANOTUBES

BACKGROUND OF THE INVENTION

Field of the Invention

This invention relates generally to rubber compositions having nanoparticles and more particularly, to rubber compositions that were produced with disaggregated carbon nanotubes.

SUMMARY OF THE INVENTION

Particular embodiments of the present invention include treads and/or other tire components that are formed using rubber compositions having solid agglomerated material comprising disaggregated carbon nanotubes. Other articles may be made at least in part from such rubber compositions. Such include rubber compositions based upon a cross-linkable rubber composition that comprises a diene rubber component and a solid agglomerated material comprising disaggregated carbon nanotubes consisting of a continuous network of carbon nanotubes.

The continuous network includes 1) voids and 2) aggregates of carbon nanotubes having a $d_{50}$ mean size of less than 5 µm, the voids and the aggregates together being in an amount that is less than 60% of a predetermined surface area, such percentage as determined by electron microscopy imagery analysis, the remainder being the disaggregated carbon nanotubes in the continuous network that do not comprise a clearly defined shape and being in an amount that is at least 40% of the predetermined surface area. The cross-linkable rubber composition further includes a cure system.

The foregoing and other objects, features and advantages of the invention will be apparent from the following more detailed descriptions of particular embodiments of the invention.

DETAILED DESCRIPTION OF PARTICULAR EMBODIMENTS

Figure 1:
FIG. 1 is a photomicrograph showing the raw carbon nanotubes comprising primary aggregates obtained during their synthesis. (Comparison)

Embodiments of the present invention include rubber compositions that include carbon nanotubes as reinforcement filler. Such rubber compositions are useful for a variety of articles such as, for example, tire components for pneumatic and non-pneumatic tires including tire treads. While it is well known to use carbon black and silica as reinforcement fillers in rubber compositions, the particular embodiments of the rubber compositions disclosed herein utilize carbon nanotubes as a reinforcement filler that are added to the rubber composition as a solid agglomerated material comprising disaggregated carbon nanotubes. The makeup and physical characteristics of such materials and their methods of making are fully described in the patent application of Arkema filed in the French INPI as patent application number FR 1850241, filed Jan. 12, 2018, which application is fully incorporated herein by reference. Arkema is a global manufacturer in specialty chemicals and advanced materials and is headquartered in France.

Surprisingly these disaggregated carbon nanotubes that are useful in particular embodiments of the rubber compositions disclosed herein break the compromise between hysteresis and wear characteristics. As is often found by those skilled in the art of tire materials, changing a material to improve one characteristic of a tire will often result in a compromise; i.e., an offsetting decline in another tire characteristic. Typically a rubber composition that is useful for manufacturing a tire component that provides a lower hysteresis property will also result in one that provides less wear resistance. Therefore tire designers search for materials that will break this compromise.

As used herein, "phr" is "parts per hundred parts of rubber by weight" and is a common measurement in the art wherein components of a rubber composition are measured relative to the total weight of rubber in the composition, i.e., parts by weight of the component per 100 parts by weight of the total rubber(s) in the composition.

As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon or comprises the constituents of the cross-linkable rubber composition.

As used herein, rubber and elastomer are synonymous terms.

As is generally known, tires are made of many different components, the most commonly known components being the treads and the sidewall of the tire since these are easily seen and can be inspected for damage and wear most easily by consumers. Other components of the tire may include, for example, those that are in the crown portion of the tire under the tread such as the belts and plies that are layers of steel wires or textile covered or coated in a rubber composition. The belts provide stiffness to the casing for better wear performance and handling while the plies typically extend from bead to bead and are the primary reinforcing material in the tire casing. Particular embodiments of the invention disclosed herein include tire components that are formed at least in part with the rubber compositions having the disaggregated carbon nanotubes.

As is generally known, a tire tread includes the road-contacting portion of a vehicle tire that extends circumferentially about the tire. It is designed to provide the handling characteristics required by the vehicle; e.g., traction, dry braking, wet braking, cornering and so forth—all preferably being provided with a minimum amount of generated noise and at low rolling resistance.

Treads of the type disclosed herein include tread elements, the structural features of the tread that contact the ground. Such structural features may be of any type or shape, examples of which include tread blocks and tread ribs. Tread blocks have a perimeter defined by one or more grooves that create an isolated structure in the tread while a rib runs substantially in the longitudinal (circumferential) direction and is not interrupted by grooves that run in the substantially lateral (axial) direction or any other grooves that are oblique thereto. The radial (depth) direction is perpendicular to the lateral direction.

It is recognized that treads may be formed from only one rubber composition or in two or more layers of differing rubber compositions, e.g., a cap and base construction. In a cap and base construction, the cap portion of the tread is made of one rubber composition that is designed for contract with the road. The cap is supported on the base portion of the tread, the base portion made of different rubber composition. In particular embodiments of the present invention the entire tread may be made from the rubber compositions disclosed herein while in other embodiments only the cap portions of the tread may be made from such rubber compositions.

In other embodiments it is recognized that the contact surface of the tread elements, i.e., that portion of the tread element that contacts the road, may be formed totally and/or only partially from the rubber compositions disclosed herein. In particular embodiments the tread block, for example, may be formed as a composite of laterally layered rubber compositions such that at least one lateral layer of a tread block is of the rubber compositions disclosed herein and another lateral layer of a tread block is of an alternative rubber composition. For example, at least 80% of the total contact surface area of the tread may be formed solely from the rubber compositions disclosed herein. The total contact surface area of the tread is the total surface area of all the radially outermost faces of the tread elements that are adapted for making contact with the road.

The rubber compositions that are disclosed herein and are useful, e.g., for tire components include the disaggregated carbon nanotubes as a reinforcement filler that are added to the rubber composition as a solid agglomerated material. The solid agglomerated material comprises the disaggregated carbon nanotubes consisting of a continuous network of carbon nanotubes. This continuous network comprises aggregates of carbon nanotubes having a $d_{50}$ mean size of less than 5 µm being in an amount that is less than 60% of a predetermined surface area, such percentage determined by electron microscopy imagery analysis. The remainder, being in an amount of at least 40% of the predetermined surface area, is the disaggregated carbon nanotubes in the continuous network that do not comprise a clearly defined shape.

This remainder of the continuous network of carbon nanotubes having the disaggregated carbon nanotubes is amorphous in that it does not have a clearly defined shape or form and is unclassifiable in the 0.5-5 micron scale. As previously noted, the makeup and physical characteristics of such materials and their methods of making are fully described in the patent application of Arkema, a French company, filed in the French INPI as patent application number FR 1850241, filed Jan. 12, 2018, which application is fully incorporated herein by reference for all of its teachings, including a full description of the material and its methods of making.

The disaggregated carbon nanotubes making up the solid agglomerated material in particular embodiments disclosed herein may be of the single-walled (SWNT), double-walled (DWNT) or multiwalled (MWNT) type.

Carbon nanotubes typically have an average diameter of between 0.1 nm and 200 nm, or alternatively between 0.1 nm and 100 nm, between 0.4 nm and 50 nm, between 1 nm to 30 nm, or between 10 and 15 nm, and advantageously a length of more than 0.1 µm and advantageously between 0.1 µm and 20 µm, between 0.1 µm and 10 µm, for example of about 6 µm. Their length/diameter ratio is advantageously greater than 10 and most often greater than 100.

They may have closed and/or open ends. These nanotubes are generally obtained by chemical vapour deposition. Their specific surface area is for example between 100 $m^2/g$ and 300 $m^2/g$, or alternatively between 200 $m^2/g$ and 300 $m^2/g$, and their apparent density may notably be between 0.01 $g/cm^3$ and 0.5 $g/cm^3$ or alternatively between 0.07 $g/cm^3$ and 0.2 $g/cm^3$. Multiwalled carbon nanotubes may for example comprise from 5 to 15 sheets and more preferably from 7 to 10 sheets.

An example of crude CNTs in the powdered state usable for preparing the disaggregated CNTs that are useful for the rubber compositions disclosed herein is notably the trade name Graphistrength® C100 from Arkema.

According to particular embodiments disclosed herein, the disaggregated CNTs comprise metallic or mineral impurities, in particular the metallic and mineral impurities derived from the synthesis of crude CNTs in the powdered state. The amount of non-carbon impurities may be between 2 and 20 wt %.

According to particular embodiments disclosed herein, the disaggregated CNTs are free from metallic impurities, and result from crude CNTs in the powdered state that have been purified in order to remove the impurities inherent in their synthesis.

The crude or ground nanotubes may be purified by washing with a solution of sulphuric acid, so as to remove any residual mineral and metallic impurities from them, for example such as iron derived from the method of preparation. The weight ratio of nanotubes to sulphuric acid may notably be between 1:2 and 1:3. The purification operation may, moreover, be carried out at a temperature from 90 to 120° C., for example for a time from 5 to 10 hours. This operation may advantageously be followed by steps of rinsing with water and drying the purified nanotubes. The nanotubes may as a variant be purified by thermal treatment at high temperature, typically above 1000° C.

According to particular embodiments, the disaggregated CNTs may be oxidized CNTs.

Oxidation of the nanotubes is advantageously carried out by bringing them into contact with a solution of sodium hypochlorite containing from 0.5 to 15 wt % of NaOCl and preferably from 1 to 10 wt % of NaOCl, for example in a weight ratio of nanotubes to sodium hypochlorite from 1:0.1 to 1:1. Oxidation is advantageously carried out at a temperature below 60° C. and preferably at room temperature, for a time from a few minutes to 24 hours. This operation of oxidation may advantageously be followed by steps of filtration and/or centrifugation, washing and drying of the oxidized nanotubes.

As mentioned above, particular embodiments of the rubber compositions disclosed herein may include disaggregated CNTs that form a continuous network comprising CNT aggregates with an average size $d_{50}$ under 5 µm, in a proportion below 60% by area determined by image analysis by electron microscopy or alternatively less than 40%, less than 20%, or less than 10%.

Additionally, such continuous networks of CNTs include the disaggregated nanotubes in a proportion of at least 40% by area, or alternatively at least 60%, at least 80%, or at least 90% by area, according to image analysis by electron microscopy. In other words, the continuous network of disaggregated carbon nanotubes includes areas of identifiable imperfections that are 1) voids and 2) aggregates having an average $d_{50}$ size of less than 5 µm that are not as desirable as the disaggregated carbon nanotubes in the continuous network.

In particular embodiments, the disaggregated CNTs are free from organic compounds on their surface.

A method for preparing the disaggregated CNTs making up the solid agglomerated material in particular embodiments disclosed herein uses a compounding device to compress a CNT powder and shear the CNT aggregates so as to reduce their size and the entanglement of the CNTs.

Examples of co-kneaders usable according to the invention are the BUSS® MDK 46 co-kneaders and those of the series BUSS® MKS or MX, marketed by the company BUSS AG, which all consist of a screw shaft provided with flights, arranged in a heating barrel optionally consisting of several parts and whose inside wall is provided with kneading teeth suitable for interacting with the flights to produce shearing of the material being kneaded. The shaft is rotated, and is provided with oscillating motion in the axial direction, by a motor. These co-kneaders may be equipped with a granule-producing system, fitted for example at their discharge orifice, and which may consist of an extrusion screw or a pump.

The co-kneaders usable according to the invention preferably have a screw ratio L/D in the range from 7 to 22, for example from 10 to 20, whereas the co-rotating extruders advantageously have a ratio L/D from 15 to 56, for example from 20 to 50.

To achieve optimum shearing of the CNT aggregates as well as minimum entanglement of the CNTs in the aggregates, it is generally necessary to apply considerable mechanical energy, which is preferably above 0.05 kWh/kg of material, in the compounding device.

According to the method of the invention, compounding of the powder is carried out in the presence of a sacrificial substance in a weight ratio from 10:90 to 40:60, preferably from 10:90 to 32:68, or even from 20:80 to 30:70, so as to obtain agglomerated particles comprising disaggregated CNTs and the sacrificial substance, the sacrificial substance then being removed to form the disaggregated CNTs free from organic compounds. It has in fact been shown that in this ratio, optimum compounding is possible for a wide range of sacrificial substances.

The following may be used as sacrificial substances, although this is not an exhaustive list: a solvent that does not leave any residue after it is removed by drying the agglomerated solid material, or an organic substance that does not leave any residues after pyrolysis of the agglomerated solid material, or a substance in the supercritical state that does not leave any residue after degassing, for example supercritical $CO_2$.

Preferably water, an alcohol, or other hydrophilic solvents, as well as mixtures thereof, preferably water, are used as the solvent.

Preferably, a polymer such as a polypropylene PP, a polyethylene terephthalate PET, a polycarbonate PC, a polyamide PA, preferably a polypropylene PP, is used as the organic substance.

According to particular embodiments, it is possible to add inorganic compounds such as metal oxides or salts in the compounding device, in order to obtain an agglomerated solid material of disaggregated CNTs comprising mineral compounds that are beneficial for the intended application. We may mention for example soda, zinc oxide or titanium oxide, a carbonate, a hydroxide, a metal oxide or sulphide for example of lithium, manganese, nickel, or cobalt.

It is also possible to add other carbon-containing nanofillers such as graphene, graphite, or carbon black in an amount suitable for the intended application.

Typically the manufacture of carbon nanotubes results in primary aggregates of materials—that is, of clumps of carbon nanotubes. These primary aggregates are difficult to mix into rubber compositions so that a uniform distribution of the carbon nanotubes is achieved. As is known in the art, reinforcement fillers must be well distributed throughout the matrix of the rubber composition to achieve the optimal effect of the filler.

The disaggregated carbon nanotubes used in particular embodiments of the rubber compositions disclosed herein should be understood to mean that in bulk, the carbon nanotubes are no longer in the form of the primary aggregates that resulted from their synthesis but are instead exfoliated into a continuous network of carbon nanotubes that, in the form of the solid agglomerated material does not correspond to a material that retains the shape memory of the primary aggregates. As noted above, the continuous network of the disaggregated carbon nanotubes is amorphous. Importantly, however, the carbon nanotubes themselves retain the diameter and the number of walls that they had in their primary aggregate form; i.e., the size of the carbon nanotubes are not modified from the form they had when first manufactured. It is noted, therefore, that the solid agglomerated material useful in particular embodiments disclosed herein does not include solid agglomerated material consisting of carbon nanotubes in the form of compressed primary aggregates.

As noted above, the continuous network of carbon nanotubes that is included with the disaggregated carbon nanotubes comprises 1) voids and 2) aggregates of carbon nanotubes having a $d_{50}$ mean size of less than 5 µm, the voids and aggregates together in a proportion that is less than 60% of a predetermined surface area or alternatively less than 40%, less than 30%, less than 20% or less than 10% of the predetermined surface area. This morphology can be determined by electron microscopy imagery analysis.

In such analysis, the determination of the mean proportion of aggregates having a $d_{50}$ mean size of less than 5 µm is determined from a sample surface area of 400 µm². Ten electron micrographs are taken over a surface area of 20 µm×20 µm, five of the ten taken in aggregate-rich regions and five taken in which the aggregates are less visible. All the images are taken on a fresh break in the solid material using Transmission Electronic Microscope (TEM) in known manner.

The images may be analyzed so as to select the identifiable forms between 0.5 µm and 5 µm in size and determine the surface area that they occupy. The identifiable forms are either aggregates (the light regions) or voids (the dark regions). The gray regions are attributed to the continuous network of carbon nanotubes and are considered to be the background surface of the image that is not covered by the identifiable forms. In other words, the gray regions are the disaggregated carbon nanotubes that do not comprise a clearly defined shape and being in an amount of at least 40% of the predetermined area or alternatively at least 60%, at least 70%, at least 80% or at least 90% of the area.

The percentage of the surface area of the image with identifiable forms is calculated from the following equation:

$$A\% = S\ \mu m^2 * 100/400\ \mu m^2$$

where A is the percentage of surface area of the image filled with identifiable forms (aggregates and voids), S is the measured surface area of the image filled with identifiable forms and 400 is the surface area over which the sample was measured.

FIG. 1 is a photomicrograph showing the raw carbon nanotubes comprising primary aggregates obtained during their synthesis. It is noted that the aggregates of carbon nanotubes of a $d_{50}$ mean size of less than 5 microns is in a proportion of greater than 90%.

Figure 2:
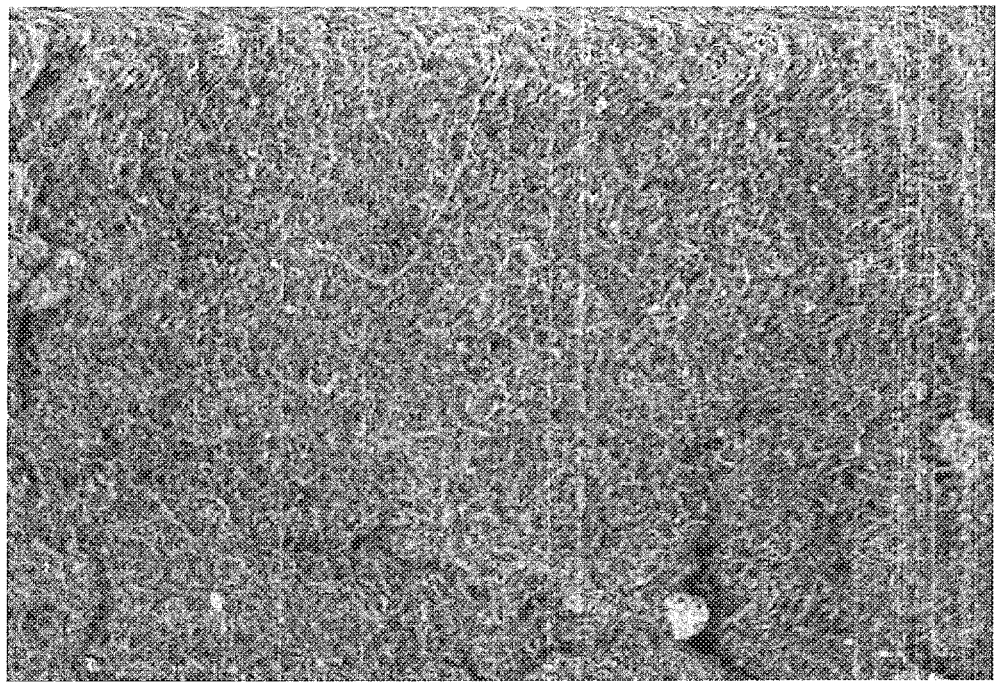
FIG. 2 is a photomicrograph showing an example of a solid agglomerated material useful in the rubber compositions disclosed herein.

FIG. 2 is a photomicrograph showing an example of a solid agglomerated material useful in the rubber compositions disclosed herein. Using the electron microscopy imagery analysis described above, the aggregates of carbon nanotubes that have a mean size $d_{50}$ of less than 5 µm is in a proportion of about 6% of the predetermined surface area.

This photomicrograph further shows that the continuous network of the carbon nanotubes is homogenous. The presence of inorganic metal oxide can be identified by the little points.

In particular embodiments, the solid agglomerated material may include chemical compounds of an inorganic nature, intimately included within the entanglement of the carbon nanotubes. The inorganic materials may consist of metal species, carbon, silicon, sulfur, phosphorous, boron and other solid elements; oxides, sulfides, metal nitrides, hydroxides and salts, ceramics of complex structure or mixtures of these inorganic materials.

The chemical compounds of inorganic nature may have different, isotropic or anisotropic form factor and have a maximum dimension of 1 mm. According to particular embodiments, the bulk density of the solid agglomerated material is between 0.01 g/cm$^3$ and 2 g/cm$^3$ or alternatively between 0.1 g/cm$^3$ and 1.0 g/cm$^3$.

In particular embodiments, the surface of the carbon nanotubes making up the solid agglomerated material may have a certain degree of oxidation.

In particular embodiments, the solid agglomerated material is devoid of organic compounds. Devoid of organic compounds means that the loss of mass between 150° C. and 350° C. is less than 1% as determined by thermogravimetric analysis. To perform this TGA method, a sample of 10 mg of the material is placed in a thermogravimetric analyzer while the temperature is increased between 150° C. and 350° C. at 5° C. per minute. To be determined to be free from organic compounds, the loss of mass is less than 1%.

The solid agglomerated material may be in any bulk form as spheres, cylinders, flakes, granules, bricks or combinations thereof, wherein a smallest diameter of the form is greater than 1 mm. In some embodiments, the material is in the form of granules.

Generally the process for making such solid agglomerated includes compressing the carbon nanotube powder in the presence of at least one sacrificial substance and then subjecting it to high-shear mixing in the compressed state. The sacrificial substance is eliminated and the remainder is the solid agglomerated material of disaggregated carbon nanotubes that are devoid of organic compounds. The sacrificial substance may be, for example, water that can be evaporated or an organic material that can be eliminated by pyrolysis, such as a polypropylene polymer.

As noted above, the disaggregated carbon nanotubes within the continuous network retain their diameter and the number of walls that they had in their primary aggregate form; i.e., the size of the carbon nanotubes are not modified from the form they had when first manufactured but the continuous network is amorphous, without clearly defined shapes.

Nanotubes can generally be described as being rolled sheets of graphene and can be classified being single-walled, double-walled or multi-walled. Double and multi-walled nanotubes comprise tubes that are concentrically nested to form the multi-walled nanotubes. Particular embodiments of the rubber compositions disclosed may include single-walled carbon nanotubes, double-walled carbon nanotubes, multi-walled carbon nanotubes and combinations thereof in the continuous network of carbon nanotubes. Other embodiments may be limited to carbon nanotubes having larger diameters that may be found in double-walled or multi-walled nanotubes and thus may explicitly rule out single-walled nanotubes. Other embodiments are limited to just multi-walled nanotubes.

As noted above, nanotubes may generally be thought, for example, of having a diameter or thickness of between about 1 nm to about 100 nm and an average L/D (length to diameter ratio) of between 10/1 and 10,000/1.

Determination of length and diameter of the nanotubes may be through Transmission Electronic Microscope (TEM) in known manner. The TEM can distinguish the difference of 0.1 nm and a carbon nanotube sample ground into a fine power and ultrasonically dispersed in a solvent (such as ethanol) can be examined under the TEM and the length and diameters of the tubes measured. The average diameter is the mean value of all the measured diameters using nm as unit. The average length is determined by the mean value of all the measured lengths.

Particular embodiments of the rubber compositions disclosed herein may include carbon nanotubes in the continuous network of carbon nanotubes having a diameter, for example, of between 1 nm and 100 nm or alternatively between 5 nm and 100 nm, between 5 nm and 50 nm, between 5 nm and 25 nm, between 8 nm and 50 nm, between 8 nm and 25 nm or between 8 nm and 20 nm. Particular embodiments may further include carbon nanotubes having an L/D ratio, for example, of between 10/1 and 10,000/1 or alternatively between 50/1 and 1000/1, between 90/1 and 1000/1 or between 100/1 and 900/1.

The amount of the solid agglomerated material added to the rubber compositions disclosed for particular embodiments herein may include, for example, between 1 phr and 75 phr of the solid aggregated material or alternatively between 2 phr and 60 phr, between 5 phr and 50 phr, 1 phr and 50 phr, between 10 phr and 50 phr or between 10 phr and 40 phr of the solid aggregated material.

In addition to the solid agglomerated material, the rubber compositions disclosed herein further include a rubber component. The diene elastomers or rubbers that are useful for such rubber compositions are understood to be those elastomers resulting at least in part, i.e., a homopolymer or a copolymer, from diene monomers, i.e., monomers having two double carbon-carbon bonds, whether conjugated or not.

These diene elastomers may be classified as either "essentially unsaturated" diene elastomers or "essentially saturated" diene elastomers. As used herein, essentially unsaturated diene elastomers are diene elastomers resulting at least in part from conjugated diene monomers, the essentially unsaturated diene elastomers having a content of such members or units of diene origin (conjugated dienes) that is at least 15 mol. %. Within the category of essentially unsaturated diene elastomers are highly unsaturated diene elastomers, which are diene elastomers having a content of units of diene origin (conjugated diene) that is greater than 50 mol. %.

Those diene elastomers that do not fall into the definition of being essentially unsaturated are, therefore, the essentially saturated diene elastomers. Such elastomers include, for example, butyl rubbers and copolymers of dienes and of alpha-olefins of the EPDM type. These diene elastomers have low or very low content of units of diene origin (conjugated dienes), such content being less than 15 mol. %.

Examples of suitable conjugated dienes include, in particular, 1,3-butadiene, 2-methyl-1,3-butadiene, 2,3-di($C_1$-$C_5$ alkyl)-1,3-butadienes such as, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Examples of vinyl-aromatic compounds include styrene, ortho-, meta- and para-methylstyrene, the commercial mixture "vinyltoluene", para-tert-butylstyrene, methoxystyrenes, chloro-styrenes, vinylmesitylene, divinylbenzene and vinylnaphthalene.

The copolymers may contain between 99 wt. % and 20 wt. % of diene units and between 1 wt. % and 80 wt. % of vinyl-aromatic units. The elastomers may have any microstructure, which is a function of the polymerization conditions used, in particular of the presence or absence of a modifying and/or randomizing agent and the quantities of modifying and/or randomizing agent used. The elastomers may, for example, be block, random, sequential or microsequential elastomers, and may be prepared in dispersion or in solution; they may be coupled and/or starred or alternatively functionalized with a coupling and/or starring or functionalizing agent.

Examples of suitable diene elastomers include polybutadienes, particularly those having a content of 1,2-units of between 4 mol. % and 80 mol. % or those having a cis-1,4 content of more than 80 mol. % or more than 90 mol. %. Also included are polyisoprenes and butadiene/styrene copolymers, particularly those having a styrene content of between 1 wt. % and 50 wt. % or of between 20 wt. % and 40 wt. % and in the butadiene faction, a content of 1,2-bonds of between 4 mol. % and 65 mol. %, a content of trans-1,4 bonds of between 20 mol. % and 80 mol. %. Also included are butadiene/isoprene copolymers, particularly those having an isoprene content of between 5 wt. % and 90 wt. % and a glass transition temperature (Tg, for elastomers is measured by DSC in accordance with ASTM D3418) of −40° C. to −80° C.

Further included are isoprene/styrene copolymers, particularly those having a styrene content of between 5 wt. % and 50 wt. % and a Tg of between −25° C. and −50° C. In the case of butadiene/styrene/isoprene copolymers, examples of those which are suitable include those having a styrene content of between 5 wt. % and 50 wt. % and more particularly between 10 wt. % and 40 wt. %, an isoprene content of between 15 wt. % and 60 wt. %, and more particularly between 20 wt. % and 50 wt. %, a butadiene content of between 5 wt. % and 50 wt. % and more particularly between 20 wt. % and 40 wt. %, a content of 1,2-units of the butadiene fraction of between 4 wt. % and 85 wt. %, a content of trans-1,4 units of the butadiene fraction of between 6 wt. % and 80 wt. %, a content of 1,2-plus 3,4-units of the isoprene fraction of between 5 wt. % and 70 wt. %, and a content of trans-1,4 units of the isoprene fraction of between 10 wt. % and 50 wt. %, and more generally any butadiene/styrene/isoprene copolymer having a Tg of between −20° C. and −70° C.

The diene elastomers used in particular embodiments of the present invention may further be functionalized, i.e., appended with active moieties. As is well known in the art, elastomers can be functionalized by reacting them with suitable functionalizing agents prior to or in lieu of terminating the elastomer. Exemplary functionalizing agents include, but are not limited to, metal halides, metalloid halides, alkoxysilanes, imine-containing compounds, esters, ester-carboxylate metal complexes, alkyl ester carboxylate metal complexes, aldehydes or ketones, amides, isocyanates, isothiocyanates and imines. The functional moieties may be appended to the chain ends or within the backbone. One example functionalized elastomers include silanol end-functionalized elastomers that are well known in the industry. Examples of such materials and their methods of making may be found in U.S. Pat. No. 6,013,718, issued Jan. 11, 2000, which is hereby fully incorporated by reference.

The silanol end-functionalized SBR used in particular embodiments of the rubber compositions disclosed herein may be characterized as having a glass transition temperature Tg, for example, of between −50° C. and −10° C. or alternatively between −40° C. and −15° C. or between −30° C. and −20° C. as determined by differential scanning calorimetry (DSC) according to ASTM E1356. The styrene content, for example, may be between 15% and 30% by weight or alternatively between 20% and 30% by weight with the vinyl content of the butadiene part, for example, being between 25% and 70% or alternatively, between 40% and 65% or between 50% and 60%.

In summary, suitable diene elastomers for particular embodiments of the rubber compositions disclosed herein may include highly unsaturated diene elastomers such as polybutadienes (BR), polyisoprenes (IR), natural rubber (NR), butadiene copolymers, isoprene copolymers and mixtures of these elastomers. Such copolymers include butadiene/styrene copolymers (SBR), isoprene/butadiene copolymers (BR), isoprene/styrene copolymers (SIR) and isoprene/butadiene/styrene copolymers (SBIR). In particular embodiments, suitable elastomers may also include any of these elastomers being functionalized elastomers.

Particular embodiments of the rubber compositions disclosed herein may contain only one diene elastomer and/or a mixture of two or more diene elastomers. While some embodiments are limited only to the use of one or more highly unsaturated diene elastomers, other embodiments may include the use of diene elastomers mixed with any type of synthetic elastomer other than a diene elastomer or even with polymers other than elastomers as, for example, thermoplastic polymers.

In addition to the solid agglomerated material having the continuous network of disaggregated carbon nanotubes and the diene rubber component, particular embodiments of the rubber compositions disclosed herein may further optionally include an amount of a secondary reinforcement filler.

Reinforcing fillers useful as the secondary reinforcement filler are well known in the art and include, for example, carbon blacks and silica though any additional reinforcing filler known to those skilled in the art may also be useful. In particular embodiments of the rubber composition, the secondary filler may be selected from carbon black, silica or combinations thereof. Other embodiments may be limited to just carbon black or limited to just silica as the secondary reinforcement filler.

Carbon black, which is an organic filler, is well known to those having ordinary skill in the rubber compounding field. Suitable carbon blacks are any carbon blacks known in the art and suitable for the given purpose. Suitable carbon blacks of the type HAF, ISAF and SAF, for example, are conventionally used in tire treads. Non-limitative examples of carbon blacks include, for example, the N115, N134, N234, N299, N326, N330, N339, N343, N347, N375 and the 600 series of carbon blacks, including, but not limited to N630, N650 and N660 carbon blacks. The 700 series of carbon blacks include, for example, N754, N772 and N787 while the 900 series of carbon blacks include, for example, N990 and N991.

As noted above, silica may also be useful as reinforcement filler. The silica may be any reinforcing silica known to one having ordinary skill in the art including, for example, any precipitated or pyrogenic silica having a BET surface area and a specific CTAB surface area both of which are less than 450 m$^2$/g or alternatively, between 30 and 400 m$^2$/g may be suitable for particular embodiments based on the desired properties of the cured rubber composition. Particular embodiments of rubber compositions disclosed herein may include a silica having a CTAB of between 80 and 200 $m^2/g$, between 100 and 190 $m^2/g$, between 120 and 190 $m^2/g$ or between 140 and 180 $m^2/g$. The CTAB specific surface area is the external surface area determined in accordance with Standard AFNOR-NFT-45007 of November 1987.

Highly dispersible precipitated silicas (referred to as "HDS") may be useful in particular embodiments of such rubber compositions disclosed herein, wherein "highly dispersible silica" is understood to mean any silica having a substantial ability to disagglomerate and to disperse in an elastomeric matrix. Such determinations may be observed in known manner by electron or optical microscopy on thin sections. Examples of known highly dispersible silicas include, for example, Perkasil KS 430 from Akzo, the silica BV3380 from Degussa, the silicas Zeosil 1165 MP and 1115 MP from Rhodia, the silica Hi-Sil 2000 from PPG and the silicas Zeopol 8741 or 8745 from Huber.

When silica is added to the rubber composition, a proportional amount of a silane coupling agent is also added to the rubber composition. The silane coupling agent is a sulfur-containing organosilicon compound that reacts with the silanol groups of the silica during mixing and with the elastomers during vulcanization to provide improved properties of the cured rubber composition. A suitable coupling agent is one that is capable of establishing a sufficient chemical and/or physical bond between the inorganic filler and the diene elastomer; which is at least bifunctional, having, for example, the simplified general formula "Y-T-X", in which: Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica); X represents a functional group ("X" function) which is capable of bonding physically and/or chemically with the diene elastomer, for example by means of a sulfur atom; T represents a divalent organic group making it possible to link Y and X.

Any of the organosilicon compounds that contain sulfur and are known to one having ordinary skill in the art are useful for practicing embodiments of the present invention. Examples of suitable silane coupling agents having two atoms of silicon in the silane molecule include 3,3'-bis (triethoxysilylpropyl) disulfide and 3,3'-bis(triethoxy-silylpropyl) tetrasulfide (known as Si69). Both of these are available commercially from Degussa as X75-S and X50-S respectively, though not in pure form. Degussa reports the molecular weight of the X50-S to be 532 g/mole and the X75-S to be 486 g/mole. Both of these commercially available products include the active component mixed 50-50 by weight with a N330 carbon black. Other examples of suitable silane coupling agents having two atoms of silicon in the silane molecule include 2,2'-bis(triethoxysilylethyl) tetrasulfide, 3,3'-bis(tri-t-butoxy-silylpropyl) disulfide and 3,3'-bis(di t-butylmethoxysilylpropyl) tetrasulfide. Examples of silane coupling agents having just one silicon atom in the silane molecule include, for example, 3,3' (triethoxysilylpropyl) disulfide and 3,3' (triethoxy-silylpropyl) tetrasulfide. The amount of silane coupling agent can vary over a suitable range as known to one having ordinary skill in the art. Typically the amount added is between 7 wt. % and 15 wt. % or alternatively between 8 wt. % and 12 wt. % or between 9 wt. % and 11 wt. % of the total weight of silica added to the rubber composition.

The disclosed rubber compositions may include an amount of secondary filler as deemed necessary for those skilled in the art to acquire the desired properties of the final cured product. The amounts added to the rubber compositions are not particularly limited since the amounts will be determined in known way by those skilled in the art to provide the desired properties. Examples of suitable amounts may include none or for reinforcement, between 0 phr and 150 phr, between 0 phr and 100 phr, between 3 phr and 120 phr, between 3 phr and 30 phr, between 3 phr and 80 phr, between 3 phr and 20 phr, between 3 phr and 15 phr or no more than 10 phr of the secondary reinforcement filler. As is well-known, carbon black may be added in small amounts, e.g., between 3 phr and 8 phr or between 3 phr and 5 phr, to make the article black, such as for a tire component.

In addition to the agglomerated sold material, the diene elastomer and the optional reinforcing filler, particular embodiments of the rubber compositions include a curing system such as, for example, a peroxide curing system or a sulfur curing system. Particular embodiments are cured with a sulfur curing system that includes free sulfur and may further include, for example, one or more of accelerators and one or more activators such as stearic acid and zinc oxide. Suitable free sulfur includes, for example, pulverized sulfur, rubber maker's sulfur, commercial sulfur, and insoluble sulfur. The amount of free sulfur included in the rubber composition is not limited and may range, for example, between 0.5 phr and 10 phr or alternatively between 0.5 phr and 5 phr or between 0.5 phr and 3 phr. Particular embodiments may include no free sulfur added in the curing system but instead include sulfur donors.

Accelerators are used to control the time and/or temperature required for vulcanization and to improve the properties of the cured rubber composition. Particular embodiments of the present invention include one or more accelerators. One example of a suitable primary accelerator useful in the present invention is a sulfenamide. Examples of suitable sulfenamide accelerators include n-cyclohexyl-2-benzothiazole sulfenamide (CBS), N-tert-butyl-2-benzothiazole Sulfenamide (TBBS), N-Oxydiethyl-2-benzthiazolsulfenamid (MBS) and N'-dicyclohexyl-2-benzothiazolesulfenamide (DCBS). Combinations of accelerators are often useful to improve the properties of the cured rubber composition and the particular embodiments include the addition of secondary accelerators.

Particular embodiments may include as a secondary accelerant the use of a moderately fast accelerator such as, for example, diphenylguanidine (DPG), triphenyl guanidine (TPG), diorthotolyl guanidine (DOTG), o-tolylbigaunide (OTBG) or hexamethylene tetramine (HMTA). Such accelerators may be added in an amount of up to 4 phr, between 0.5 and 3 phr, between 0.5 and 2.5 phr or between 1 and 2 phr. Particular embodiments may exclude the use of fast accelerators and/or ultra-fast accelerators such as, for example, the fast accelerators: disulfides and benzothiazoles; and the ultra-accelerators: thiurams, xanthates, dithiocarbamates and dithiophosphates.

The amount of sulfur and accelerator included in the particular embodiments of the rubber compositions disclosed herein may be between 1 phr and 2 phr of sulfur or alternatively between 1 phr and 1.5 phr and enough accelerator to provide a semi-efficient curing system that has an accelerator to sulfur ratio by weight of between 0.4 and 0.6 or alternatively between 0.45 and 0.55.

Other additives can be added to the rubber compositions disclosed herein as known in the art. Such additives may include, for example, some or all of the following: antidegradants, antioxidants, fatty acids, waxes, stearic acid and zinc oxide. Examples of antidegradants and antioxidants include 6PPD, 77PD, IPPD and TMQ and may be added to rubber compositions in an amount, for example, of from 0.5 phr and 5 phr. Zinc oxide and/or stearic acid, that are known to be sulfur curing activators, may each be added in an amount, for example, of between 0.5 phr and 6 phr or alternatively, of between 0.5 phr and 4 phr. Waxes may be added in an amount, for example, of between 1 phr and 5 phr.

The rubber compositions that are embodiments of the present invention may be produced in suitable mixers, in a manner known to those having ordinary skill in the art, typically using two successive preparation phases, a first phase of thermo-mechanical working at high temperature, followed by a second phase of mechanical working at lower temperature.

The first phase of thermo-mechanical working (sometimes referred to as "non-productive" phase) is intended to mix thoroughly, by kneading, the various ingredients of the composition, with the exception of the vulcanization system. It is carried out in a suitable kneading device, such as an internal mixer or an extruder, until, under the action of the mechanical working and the high shearing imposed on the mixture, a maximum temperature generally between 120° C. and 190° C., more narrowly between 130° C. and 170° C., is reached.

After cooling of the mixture, a second phase of mechanical working is implemented at a lower temperature. Sometimes referred to as "productive" phase, this finishing phase consists of incorporating by mixing the vulcanization (or cross-linking) system (sulfur or other vulcanizing agent and accelerator(s)), in a suitable device, for example an open mill. It is performed for an appropriate time (typically between 1 and 30 minutes, for example between 2 and 10 minutes) and at a sufficiently low temperature lower than the vulcanization temperature of the mixture, so as to protect against premature vulcanization.

The invention is further illustrated by the following examples, which are to be regarded only as illustrations and not delimitative of the invention in any way. The properties of the compositions disclosed in the examples were evaluated as described below and these utilized methods are suitable for measurement of the claimed properties of the claimed invention.

The maximum tan delta and complex shear modulus dynamic properties for the rubber compositions were measured at 23° C. on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress at a frequency of 10 Hz under a controlled temperature of 23° C. Scanning was effected at an amplitude of deformation of 0.05 to 50% (outward cycle) and then of 50% to 0.05% (return cycle) or 1% to 100% back to 1% peak-to-peak. The maximum value of the tangent of the loss angle tan delta (max tan δ) was determined during the return cycle. The complex shear modulus G* was determined at 10%, 1% and 100% peak-to-peak strain during the return cycle.

Dynamic properties (G*60° C. and Tg) for the rubber compositions were measured on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress of a constant 0.7 MPa and at a frequency of 10 Hz over a temperature sweep from −80° C. to 100° C. with the temperature increasing at a rate of 1.5° C./min. The shear modulus G* was captured at 60° C. and the temperature at which the max tan delta occurred was recorded as the glass transition temperature, Tg.

Modulus of elongation (MPa) was measured at 10% (MA10) and at 300% (MA300) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

The elongation property was measured as elongation at break (%) and the corresponding elongation stress (MPa), which is measured at 23° C. in accordance with ASTM Standard D412 on ASTM C test pieces.

Example 1

This example demonstrates the improved physical characteristics of rubber compositions formulated in accordance to the disclosure herein. Rubber compositions were prepared using the components shown in Table 1. The amount of each component making up the rubber compositions shown in Table 1 are provided in parts per hundred parts of rubber by weight (phr).

TABLE 1

| Formulations | | |
|---|---|---|
| Formulations | W1 | F1 |
| SBR | 100 | 100 |
| Graphistrength C100 CNT | 27 | |
| Disaggregated CNT | | 27 |
| Resin | 36 | 36 |
| HTO | 2 | 2 |
| Wax | 1.5 | 1.5 |
| 6PPD | 2 | 2 |
| Cure Package | 9.2 | 9.2 |

The SBR elastomer was 27% styrene with an Mn of 118,700 and the butadiene portion having 24% vinyl, 46% trans and 30% cis bonds. The GRAPHISTRENGTH C100 was obtained from Arkema and was a multi-walled carbon nanotube having a length of about 1000-10,000 nm, a diameter of about 12-15 nm with about 8% impurities. The disaggregated CNT was obtained from Arkema that was formed from the C100 material to form the solid agglomerated material comprising the disaggregated carbon nanotubes. The resin was a C5-C9 resin from ExxonMobil. The cure package included sulfur, stearic acid, zinc oxide and CBS as an accelerator.

The formulations were prepared by mixing the components given in Table 1, except for the accelerator and sulfur, in a Banbury mixer. The CNT material was added in two different batches, half after about 1 minute of processing and the other half after about 1.5 minutes of processing. The mixture was dropped after the temperature reached between 125° C. and 145° C. was reached. The accelerators and sulfur were added in the second phase on a mill. Vulcanization was effected at 150° C. for 25 minutes. The formulations were then tested to measure their properties, the results of which are shown in Table 2.

TABLE 2

| Physical Properties | | |
| --- | --- | --- |
| Formulations | W1 | F1 |
| MA10, 23° C., MPa | 7.3 | 5.9 |
| MA300/100, 23° C. | 1.75 | 2.05 |
| Max tan delta, 23° C. | 0.42 | 0.39 |
| G*10% @ 23° C., MPa | 2.5 | 2.4 |
| G*60° C. MPa | 0.9 | 0.9 |
| Stress at Break @ 23° C., MPa | 13.1 | 13.9 |
| Strain at Break @ 23° C., % | 300 | 370 |
| Tg, ° C. | −14.7 | −14.3 |

As can be seen from Table 2, the rubber formulation F1 showed improved hysteresis from the max tan delta decrease and improved cohesion properties with the improved stress and strain at break, all at near constant rigidity properties as shown by G*10% and G*60.

Example 2

This example demonstrates the improved tire performance with treads made with the rubber composition of F1 of Example 1. Tires (205/55 R16) were manufactured using the rubber compositions of W1 and F1 shown in Table 1 of Example 1. The tires were mounted on cars that were driven for about 10,000 miles on public roads. The difference between the tread depth of the new tire and the tread depth measured after the tire had traveled about 10,000 was a measurement of tread wear. As is shown in Table 3, the tire having a tread of the inventive formulation F1 had an improved wear of 15% over the tire made from the tread of the witness formulation W1.

TABLE 3

| Wear Performance | | |
| --- | --- | --- |
| Wear Performance | W1 | F1 |
| Tread Loss (mm/10,000 miles) | 1.56 | 1.36 |
| Wear Performance (normalized) | 100 | 115 |

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A rubber composition based upon a cross-linkable rubber composition, the cross-linkable rubber composition comprising, in parts per 100 parts by weight of rubber:
   a diene rubber;
   a solid agglomerated material comprising disaggregated carbon nanotubes consisting of a continuous network of carbon nanotubes, the continuous network comprising 1) voids and 2) aggregates of carbon nanotubes having a $d_{50}$ mean size of less than 5 μm, the voids and the aggregates together being in an amount that is less than 60% of a predetermined surface area, such percentage as determined by electron microscopy imagery analysis, the remainder being the disaggregated carbon nanotubes in the continuous network that do not comprise a clearly defined shape and being in an amount that is at least 40% of the predetermined surface area, wherein the disaggregated carbon nanotubes of the continuous network are oxidized;
   a cure system.

2. The rubber composition of claim 1, wherein the cross-linkable rubber composition comprises between 1 phr and 75 phr of the solid agglomerated material.

3. The rubber composition of claim 1, wherein the diene rubber is a highly unsaturated rubber selected from natural rubber, a synthetic rubber or combinations thereof.

4. The rubber composition of claim 1, wherein the amount of the voids and the aggregates is less than 40% and the remainder is at least 60%.

5. The rubber composition of claim 1, wherein the amount of the voids and the aggregates is less than 10% and the remainder is at least 90%.

6. The rubber composition of claim 1, wherein the solid agglomerated material is devoid of organic compounds, as determined by thermogravimetric analysis.

7. The rubber composition of claim 1, wherein the solid agglomerated material is of a form that is spheres, cylinders, flakes, granules, bricks or combinations thereof, wherein a smallest diameter of the form is greater than 1 mm.

8. The rubber composition of claim 1, wherein the disaggregated carbon nanotubes of the continuous network are multi-walled.

9. The rubber composition of claim 1, wherein the cross-linkable rubber composition comprises no more than 10 phr of a secondary reinforcement filler.

10. The rubber composition of claim 9, wherein the secondary reinforcement filler is selected from a silica, a carbon black or combinations thereof.

11. The rubber composition of claim 10, wherein the secondary reinforcement filler is the carbon black.

12. The rubber composition of claim 1, wherein the diene rubber is selected from selected from the group consisting of a polyisoprene rubber (IR), a styrene-butadiene rubber (SBR), a polybutadiene rubber (BR) and combinations thereof.

13. A tire comprising a tire component manufactured from the rubber composition of claim 1.

14. The tire of claim 13, wherein the tire component is a tire tread.

15. A rubber composition based upon a cross-linkable rubber composition, the cross-linkable rubber composition comprising, in parts per 100 parts by weight of rubber:
a diene rubber;
a solid agglomerated material comprising oxidized disaggregated carbon nanotubes consisting of a continuous network of carbon nanotubes, the continuous network comprising 1) voids and 2) aggregates of carbon nanotubes having a $d_{50}$ mean size of less than 5 µm, the voids and the aggregates together being in an amount that is less than 40% of a predetermined surface area, such percentage as determined by electron microscopy imagery analysis, the remainder being the disaggregated carbon nanotubes in the continuous network that do not comprise a clearly defined shape and being in an amount that is at least 60% of the predetermined surface area;
a cure system.

16. The rubber composition of claim 15, wherein the cross-linkable rubber composition comprises between 1 phr and 75 phr of the solid agglomerated material.

17. The rubber composition of claim 16, wherein the diene rubber is a highly unsaturated rubber selected from natural rubber, a synthetic rubber or combinations thereof.

18. The rubber composition of claim 17, wherein the amount of the voids and the aggregates is less than 10% and the remainder is at least 90%.

19. The rubber composition of 19, wherein the disaggregated carbon nanotubes of the continuous network are multi-walled.

20. The rubber composition of 20, wherein the cross-linkable rubber composition comprises no more than 10 phr of a secondary reinforcement filler.

* * * * *